(12) United States Patent
Korse

(10) Patent No.: US 8,157,683 B2
(45) Date of Patent: Apr. 17, 2012

(54) CHAIN FOR A CHAIN TRANSMISSION

(76) Inventor: Theodorus Henricus Johannes Carolina Korse, Zoetermeer (NL)

(*) Notice: Subject to any disclaimer, the term of this patent is extended or adjusted under 35 U.S.C. 154(b) by 0 days.

(21) Appl. No.: 12/141,218

(22) Filed: Jun. 18, 2008

(65) Prior Publication Data

US 2008/0287239 A1 Nov. 20, 2008

Related U.S. Application Data

(63) Continuation of application No. PCT/EP2006/070159, filed on Dec. 22, 2006.

(30) Foreign Application Priority Data

Dec. 22, 2005 (EP) .................... 05112684

(51) Int. Cl.
*F16G 13/02* (2006.01)
*F16H 7/06* (2006.01)
(52) U.S. Cl. .................. 474/230; 474/206; 474/156
(58) Field of Classification Search .......... 474/161, 474/160, 156, 230, 231, 229, 206
See application file for complete search history.

(56) References Cited

U.S. PATENT DOCUMENTS

| | | | | |
|---|---|---|---|---|
| 799,074 A * | 9/1905 | Morse | ............. | 474/229 |
| 2,199,292 A * | 4/1940 | Pierce | ............. | 474/156 |
| 3,597,985 A | 8/1971 | Jeffrey | | |
| 4,951,457 A * | 8/1990 | Deal | ............. | 59/78 |
| 5,030,175 A * | 7/1991 | Schwengel | ............. | 474/214 |
| 5,176,585 A * | 1/1993 | Novak | ............. | 474/206 |
| 5,362,278 A * | 11/1994 | Bergles et al. | ............. | 474/69 |
| 5,362,282 A * | 11/1994 | Lickton | ............. | 474/220 |
| 5,876,159 A * | 3/1999 | Tseng et al. | ............. | 409/51 |
| 6,695,731 B2 * | 2/2004 | Linnenbrugger et al. | ... | 474/215 |
| 6,908,407 B2 * | 6/2005 | Saitoh | ............. | 474/212 |
| 7,074,147 B2 * | 7/2006 | Young | ............. | 474/161 |
| 7,179,184 B2 * | 2/2007 | Linnenbrugger et al. | ... | 474/215 |

(Continued)

FOREIGN PATENT DOCUMENTS

DE 10162850 2/2003

(Continued)

OTHER PUBLICATIONS

International Search Report, Apr. 4, 2007, 3 pages.

*Primary Examiner* — Sang Kim
*Assistant Examiner* — Henry Liu
(74) *Attorney, Agent, or Firm* — St. Onge Steward Johnston & Reens LLC

(57) ABSTRACT

The invention concerns a chain for a chain transmission with chain links coupled by a parallel chain pins, each chain link having at least one link plate, the chain pins forming pivot axes for the link plates at a pitch distance whereby a chain link axis perpendicularly intersects the two pivot axes, said link plates having towards at least one end side of the link plate a cam surface for supporting the link plate on a cylindrical support surfaces of a sprocket wheel with a pitch angle. In accordance with the invention the cam surface ends in a convex curved plane with near the end side an increasing slope angle with the link axis whereby the slope angle increases to at least half of the pitch angle or to at least seven degrees.

9 Claims, 10 Drawing Sheets

U.S. PATENT DOCUMENTS

| | | | |
|---|---|---|---|
| 7,500,928 B2 * | 3/2009 | Hummel et al. | 474/230 |
| 2005/0130780 A1 * | 6/2005 | Carolina Korse | 474/230 |
| 2005/0261095 A1 * | 11/2005 | Linnenbrugger et al. | 474/215 |
| 2006/0058142 A1 * | 3/2006 | Hasebe et al. | 474/215 |
| 2006/0079363 A1 * | 4/2006 | Miyazawa | 474/206 |
| 2006/0160648 A1 * | 7/2006 | Hummel et al. | 474/206 |
| 2009/0124444 A1 * | 5/2009 | Soerensen | 474/206 |

FOREIGN PATENT DOCUMENTS

| | | |
|---|---|---|
| EP | 0833078 A1 | 1/1998 |
| EP | 1184593 A1 | 6/2002 |
| FR | 1175812 | 4/1959 |
| JP | 61171942 | 8/1986 |
| WO | 03093700 A2 | 11/2003 |
| WO | 2006078488 | 7/2006 |

* cited by examiner

CHAIN FOR A CHAIN TRANSMISSION

CROSS-REFERENCE TO RELATED APPLICATIONS

The present application is a continuation of pending International patent application PCT/EP2006/070159, filed Dec. 22, 2006, which designates the United States and claims priority from European patent application no. 05112684.5, filed Dec. 22, 2005, the content of which is incorporated herein by reference.

FIELD OF THE INVENTION

The invention concerns a chain for a chain transmission with chain links coupled by parallel chain pins, each chain link having at least one link plate, the chain pins forming pivot axes for the link plates at a pitch distance whereby a chain link axis perpendicularly intersects the two pivot axes, the link plates having a cam surface for supporting the link plate on a cylindrical support surfaces of a sprocket wheel with a pitch angle.

BACKGROUND OF THE INVENTION

Such a chain for a chain transmission is known from WO03093700. The disadvantage of the known transmission is that leaving out the straight guide that supports the cam surfaces of the chain links before being supported by the cylindrical support surface, for instance in order to save costs, can cause wear on the corners of the cam surfaces. This wear is caused by the impact of the edge of the cam surface at the end of the chain link on the cylindrical support where the impact can create a too high stress level in the material.

In order to reduce the wear of the cam surface of the link plate the chain transmission includes a cam surface, the cam surface ends in a convex curved plane with near the end side an increasing slope angle with the link axis whereby the slope angle increases to at least half of the pitch angle or to at least seven degrees. At the location of the impact between a link plate and the cylindrical support surface the cam surface and the cylindrical support surface are parallel. As a consequence of the construction the area where the cam surface first impacts on the cylindrical support surface is limited to the area which makes an angle between zero and fifteen degrees with a line perpendicular to the path of the pitch axes of a link plate when it approaches the cylindrical support surface. The tangent to the cam surface at the impact location is parallel to the tangent on the cylindrical support surface and for this reason the location of the first impact on the cam surface is determined by the tangent of the cam surface. At the moment of impact the path of the pin axis is more or less parallel to the link axis and the surface of the impact area on the link plate makes an angle between zero and fifteen degrees with the link axis. By having the link plate in accordance with the chain for a chain transmission with chain links coupled by parallel chain pins, each chain link having at least one link plate, the chain pins forming pivot axes for the link plates at a pitch distance whereby a chain link axis perpendicularly intersects the two pivot axes, said link plates having towards at least one end side of the link plate a cam surface for supporting the link plate on a cylindrical support surfaces of a sprocket wheel with a pitch angle, characterized in that the cam surface ends in a convex curved plane with near the end side an increasing slope angle with the link axis whereby the slope angle increases to at least half of the pitch angle or to at least seven degrees, the curvature radius of the impact area of the cam surface is increased considerably whereby this does not lead to diminishing of the support the cam surface gives to the link plate so that an increase in the chordal movement of the chain is avoided. This increase of curvature radius leads to a strong reduction in the Hertz' contact stress so that excessive stress and deformation of the link plate is avoided.

SUMMARY OF THE INVENTION

In accordance with an embodiment the chain comprises a convex curved plane (27) that has a radius of curvature (Rc) that is equal to or larger than half of a distance (d) from the chain link axis (13) to the cam surface (15). Making the radius of curvature approximately a quarter to half of the width of a link plate makes the radius at the location of impact significantly larger than the fillet radius so that the Hertz' contact stress is substantially reduced.

In accordance with an embodiment the chain's radius of curvature (Rc) is at least twice the distance (d) from the chain link axis (13) to the cam surface (15). This leads to a further increase of the radius at the location of impact and to further reduction of the Hertz' contact stress.

In accordance with an embodiment the chain's cam surface (15) ends in a corner with the second leg of the corner forming an end side (16) of the link plate (12; 26; 28; 29; 33). In this way the cam surface sup-ports the link plate directly at its end, whereby due to the convex shape of the cam surface the link plate does not collide with its corner on the cylindrical support surface.

In accordance with an embodiment the chain's cam surface (15) ends in a rounded corner with a fillet radius (Rf), which fillet radius preferably is at least 0.5-1.5 mm. In this way in stamping tools used for making the link plates sharp corners can be avoided so that tool life is increased.

In accordance with an embodiment the chain comprises cam surfaces (15) near the different pivot axes (6) that have different lengths. In this way the link plates are made asymmetrical, so improving the support of the link plates in the area where the chain links move towards a sprocket wheel, whereby it is accepted that an increase in the chordal action occurs in the area where the chain links move from a sprocket wheel.

In accordance with an embodiment the chain comprises a cam surface (15) that is for a part of its length parallel to the chain link axis (13). This makes sure that the pin axes follow a straight path when approaching the sprocket wheel.

In accordance with an embodiment the chain comprises each chain link that has at least two link plates (12; 26; 28; 29; 33) that are separated by a chain bush (1) near each pivot axis (6). In this way the chain links can be supported in a more stable way.

BRIEF DESCRIPTION OF THE DRAWINGS

The invention is now explained by describing several embodiments of the invention using a drawing. In the drawing.

DETAILED DESCRIPTION OF THE INVENTION

Figure 1:
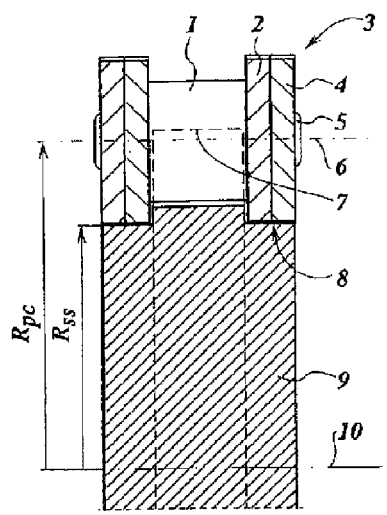
FIG. 1 shows a section of a sprocket wheel with a chain.
Figure 2:
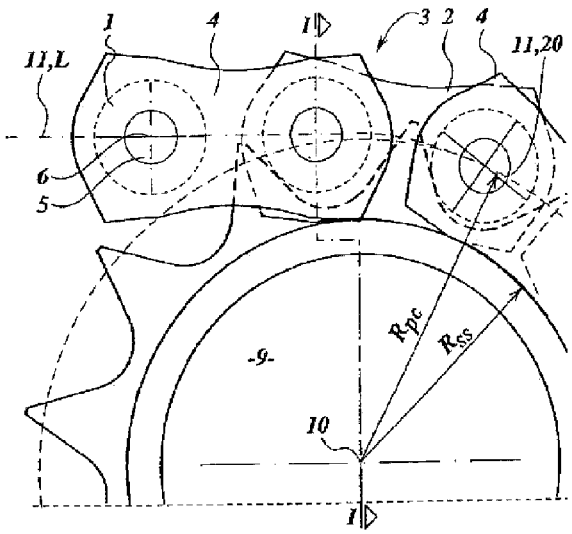
FIG. 2 shows a side view of the sprocket wheel and the chain of FIG. 1.
Figure 3:
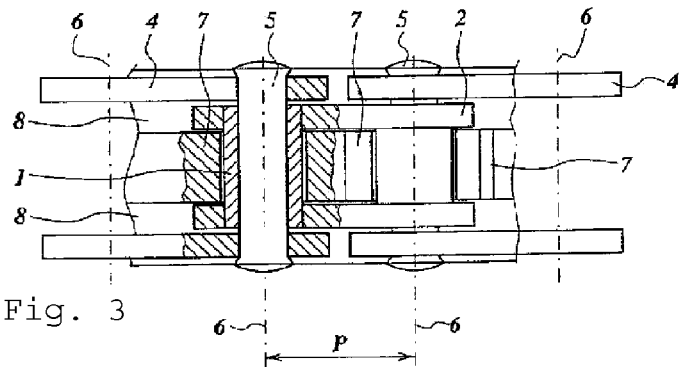
FIG. 3 shows a partial top view of the sprocket wheel and the chain of FIGS. 1 and 2.

FIGS. 1, 2 and 3 show a chain 3 engaged with a sprocket wheel 9. The sprocket wheel 9 can rotate around a sprocket wheel axis 10 and is provided with sprocket teeth 7. The sprocket wheel 9 has at both sides of the sprocket teeth 7 a support surface 8 which supports the chain 3. The chain 3 is provided with inner link plates 2. Between two inner link plates 2 there are two chain bushes 1 and together the inner link plates 2 and the chain bushes 1 form an inner link. This type of chain is called a bush chain. Two inner links are connected by two outer link plates 4 using chain pins 5 whereby the inner link and the outer link plates 4 can pivot around a pin axis 6. The distance between two pin axes 6 is a pitch p. The sprocket wheel 9 has a number of sprocket teeth 7 which engage with the chain bushes 1 so that the pin axes 6 when positioned around the sprocket wheel 9 are on a pitch circle 20 with a pitch circle radius $R_{pc}$. The inner link plates 2 and the outer link plates 4 are supported on the support surface 8 that has a support surface radius $R_{ss}$.

In the situation that the sprocket wheel 9 is part of a chain transmission the pin axes 6 follow a pin axis path 11. Around the sprocket wheel 9 this pin axis path 11 follows the pitch circle 20 and between two sprocket wheels the pin axes 6 follow a line L that is parallel to the tangent line connecting the pitch circles of the sprocket wheels in the chain transmission.

For a skilled man it will be clear that the chain 3, which in the shown embodiment is formed by a single line of chain bushes 1, can also be executed two or three lines of chain bushes 1. Such chains are known as duplex chains and triplex chains, whereby the sprocket wheels 9 are designed accordingly. For maintaining the chain links in a straight line without torsion in the chain 3 and in order to limit the stress in the chain pins 5 in these types of chain the link plates 2 and 4 are supported by support surfaces 8 on both sides of the chain bush 1.

Figure 4:
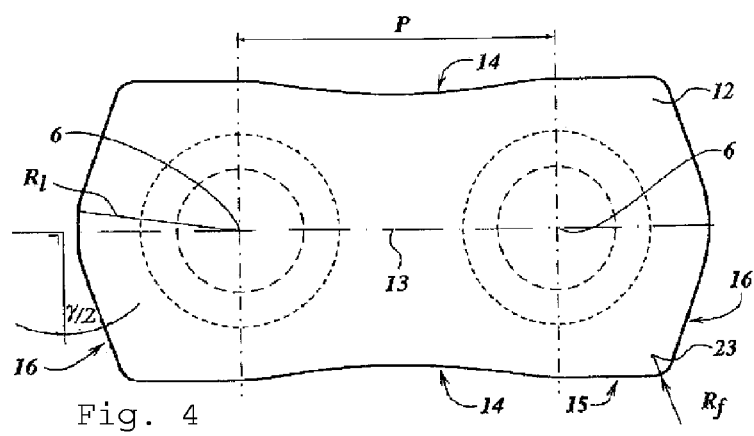
FIG. 4 shows an outside contour of an embodiment of a chain link.

FIG. 4 shows an outer circumference of a link plate 12. The link plate 12 can be used as inner link plate 2 or as outer link plate 4 and has in its longitudinal direction a chain link axis 13 which intersects the pin axes 6. At the end of a longitudinal side 14 the link plate 12 has a cam surface 15. Near the end of the link plate 12 the cam surface 15 is more or less parallel to the chain link axis 13 so that the pin axis 6 follows a more or less straight path when the cam surface 15 of the link plate 12 is supported on the support surface 8 of the sprocket wheel 9 (see hereafter). The link plate 12 ends in an end side 16 and the corner between the cam surface 15 and the end side 16 is rounded by a fillet with a fillet radius $R_f$ and a centre 23 of the fillet radius. In the shown embodiment all four corners of the link plate 12 have a cam surface 15. However if the chain 3 is used in a chain transmission with two sprocket wheels it is possible to provide only one longitudinal side 14 at both ends with cam surfaces 15 and if the chain 3 moves only in one direction one cam surface 15 will suffice.

The link plate 12 of the disclosed embodiment has a fillet radius $R_f$ which is a consequence of the production method of the link plate 12. In the situation that the link plate 12 is punched with a punching die the fillet radius $R_f$ determines the wear that occurs in this tool. For practical purposes the fillet radius $R_f$ might be approximately 0.5 to 1.5 mm. FIG. 4 shows a link plate 12 with a pitch of 8 mm with a fillet radius Rf of 0.5 mm.

Figures 5, 5A:
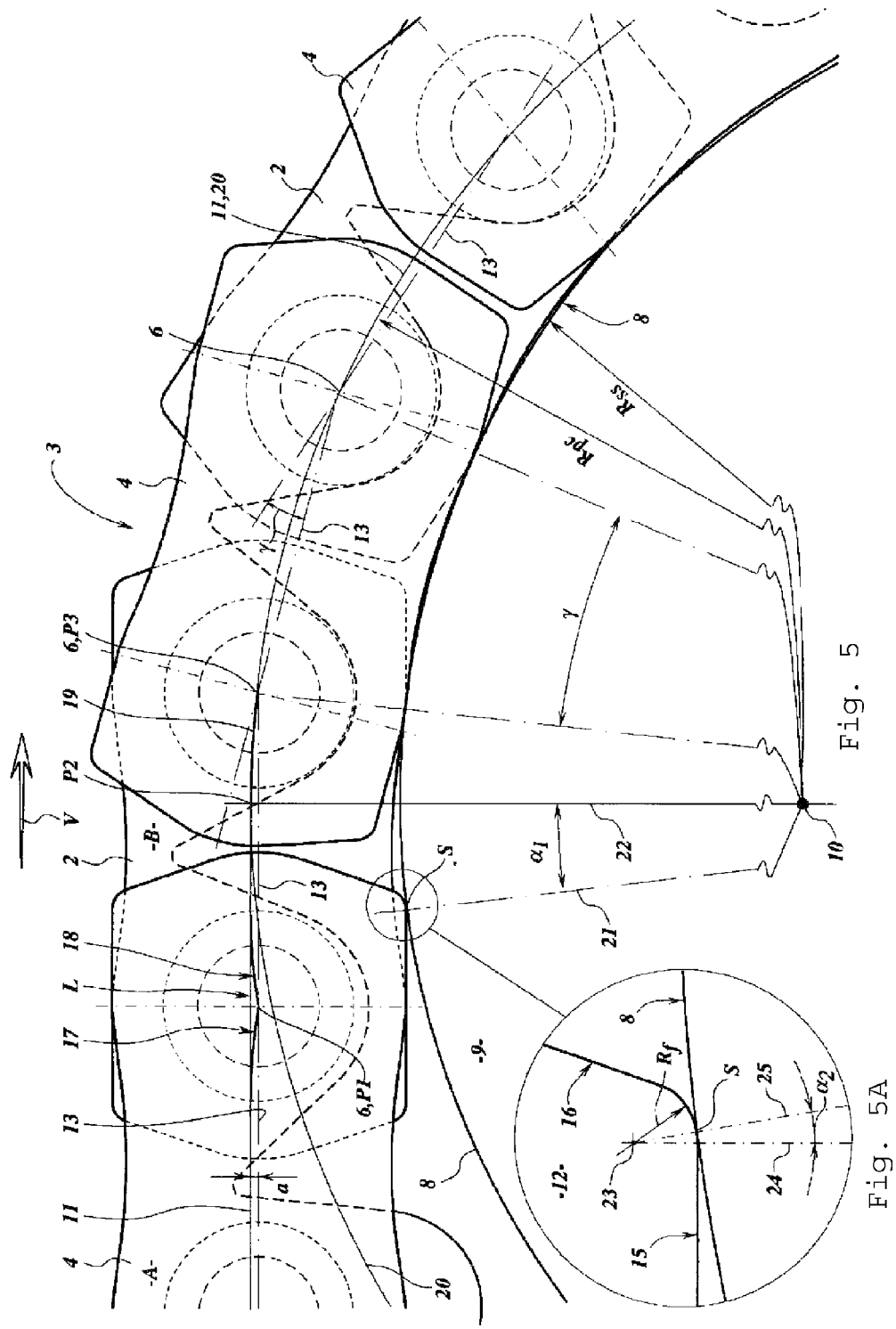
FIG. 5 shows a schematic side view of a sprocket wheel with a chain having the chain links of FIG. 4.
FIG. 5A shows a close-up view of an impact point of link plate with the support surface.

FIG. 5 shows in more detail how the chain 3 with chain links 12 contacts the sprocket wheel 9. The FIG. 5 shows the situation where a chain link A with the outer link plate 4, shown in the figure at the left side, moves in a direction V towards the sprocket wheel 9. On the side away from the sprocket wheel 9, its trailing side, the chain link A is connected to a chain link that is free from the sprocket wheel 9 and on the other side, its leading side, the chain link A is connected to a chain link B by the inner link plate 2. The cam surface 15 of chain link B is supported by the support surface 8 so that its leading side pin axis 6 is at a position P3 approximately on the pitch circle 20.

During its movement in the direction V the leading pin axis 6 of chain link B has more or less followed the pitch circle 20 along a curve 19. This curve 19 starts at a tangent point P2 which is approximately where a tangent line L to the pitch circles of two sprocket wheels coupled by the chain 3 ends on the pitch circle 20. Due to the tension in the chain 3 the trailing pivot axis 6 of chain link B, which is also the leading pivot axis 6 of chain link A, has followed a curve 17 from the tangent line L in the direction of the support surface 8. The curve 17 is parallel to the curve 19 due to the same vertical position of the leading pin 6 and the trailing pin 6 of chain link B and this causes the chain link A to move towards the support surface 8 until the cam surface 15 of the chain link plate 4 touches the support surface in a point of impact S. The common pivot axis 6 of the chain links A and B is then in position P1. When the chain links A and B move further in the direction V, the common axis 6 moves along a curve 18 towards the line L that is tangent to the pitch circles. The curve 18 is more or less parallel to the pitch circle 20. The support of the cam surface 15 of the link plates on the support surface 8 limits the chordal movement perpendicular to line L of the chain 3 between two sprocket wheels, in this case the maximum chordal movement near the sprocket wheel 9 is indicated as a chordal stroke a. It will be clear that the shape of cam surface 15 influences the paths 18 and 19 of the pin axis 6 so that they will slightly differ from the pitch circle 20 in order to maintain constant speed of the pin axes 6 along line L and when moving around the sprocket wheel 9. This is disclosed in WO 03093700.

The point of impact S (as seen in the close-up view of FIG. 5A) on the support surface 8 has a radial 21 from the sprocket wheel axis 10 and the tangent point P2 has a radial 22 from the sprocket wheel axis 10. The radial 21 and the radial 22 form an angle $\alpha_1$. On the chain link the point of impact S has a perpendicular 25 on the surface of the chain link. The perpendicular 25 makes an angle $\alpha_2$ with a line 24 perpendicular to the chain link axis 13. As the impact takes place on the surface of the fillet the centre 23 of the fillet radius is on the perpendicular 25. Due to the situation that at the moment of impact the chain link axis 13 is more or less perpendicular to the radial 22, the angle $\alpha_1$ and the angle $\alpha_2$ are more or less equal. If the number of chain links that can be fitted around the sprocket wheel 9 is z, then the pitch angle $\gamma$ is equal to 360 degrees divided by z. It appeared that the angle $\alpha_1$ is smaller than half of the pitch angle $\gamma$, and in most situations the angle $\alpha_1$ is smaller than seven to twelve degrees.

The fillet radius Rf is preferably as small as possible in order to have the cam surface 15 as large as possible towards the end side 16 of the link plate 12 in order to reduce the chordal stroke a. However a smaller fillet radius $R_f$ increases the Hertz' contact stress at the point of impact S so that at higher speeds of the chain 3 or at higher axial chain forces plastic deformation or wear of the link plates might occur. Such deformation or wear leads to increased noise, vibration and reduced life time of the chain transmission and must be avoided. In order to reduce the risk of plastic deformation the radius at the point of impact S is increased. The Hertz' contact stress is proportional to the reciprocal value of the square root of the radius. Therefore de-formation and wear decrease significantly with a limited increase in the radius at the location of contact. It has been found that the increased radius has to be applied over an angle that includes the angle $\alpha_1$ but need not to be much more so that the reduction of the cam surface 15 is limited and the chordal stroke a hardly increases.

Figure 6:
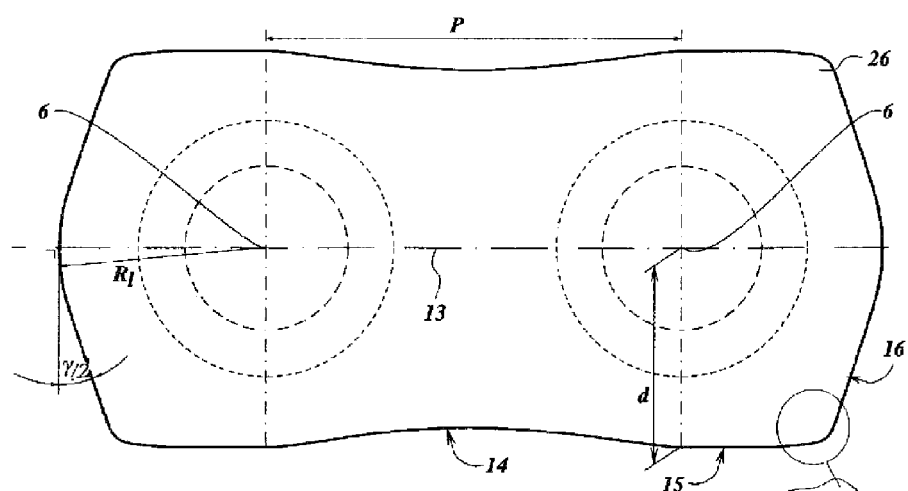
FIG. 6 shows an outside contour of a first embodiment of a chain link according to the invention.
Figure 6A:
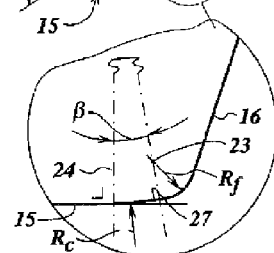
FIG. 6A shows a close-up view of an end of a link plate.

FIGS. 6 and 6A show an embodiment of the invention whereby the outer circumference of a link plate 26 has an additional curve as compared to the link plate 12. Towards the end side 16 the cam surface 15 which is more or less parallel with the chain link axis 13 forms a curve 27 with a curve radius $R_c$ and at the end of the curve 27 the cam surface ends as a fillet with the fillet radius Rf towards the end side 16 of the link plate 26. The curve 27 is tangent to the cam surface 15 and forms an increasing angle with the chain link axis 13 and has a slope angle $\beta$. The maximum value of the slope angle $\beta$ is approximately half the pitch angle $\gamma$ and generally larger than seven degrees. In the direction perpendicular to the chain link axis 13 the distance from the pin axis 6 to the surface of the cam surface 15 is a distance d. Preferably the curve radius $R_c$ is equal to or larger than half of the distance d so that it is significantly larger than the fillet radius $R_f$. By doing this the Hertz' contact stress is acceptable. In this embodiment the curve 27 is shown as a part of a circle with radius $R_c$. It is also possible that the curve has another shape as long as it has a curvature radius that is at least equal to the curve radius $R_c$.

Figures 7, 7A:
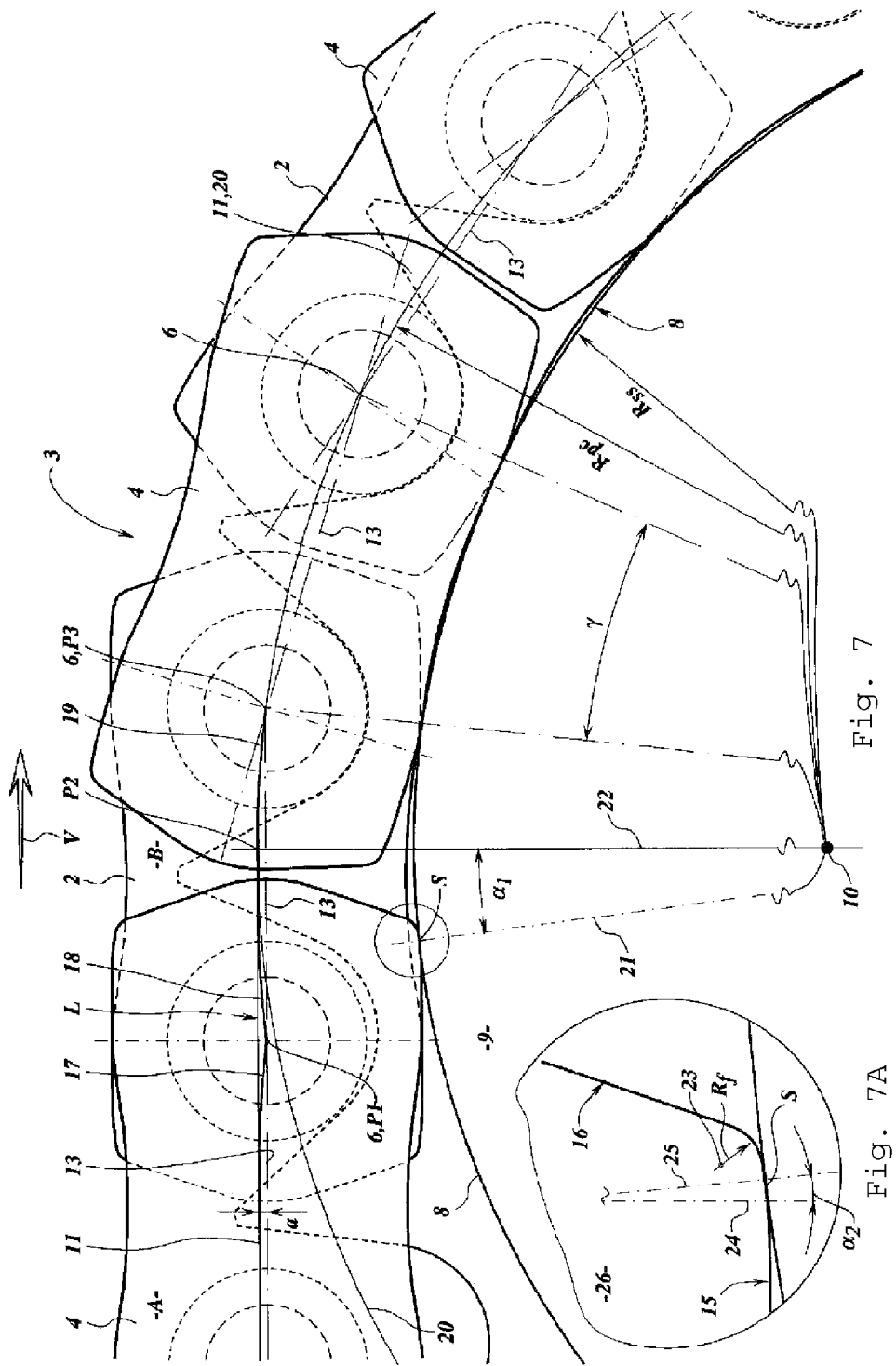
FIG. 7 shows a schematic side view of a sprocket wheel with a chain having the chain links of FIG. 6.
FIG. 7A shows a close-up view of an end of a link plate.

FIGS. 7 and 7A show in a similar way as FIG. 5 the moment of impact of the chain link A on the support surface 8, whereby the chain 3 now has the link plates 26 as shown in FIG. 6. The perpendicular 25 to the surface at the point of impact S makes an angle $\alpha_2$ with the perpendicular to the chain link axis 13. As this angle is smaller than the angle $\beta$ the surface at the point of impact S has a radius $R_c$ and the centre of the fillet radius 23 is in regard to the perpendicular 25 towards the end side 16 of the link. The radius $R_c$ at the point of impact S is sufficient to avoid high Hertz' contact stress at the impact point S. Due to the limited angle $\beta$ the chordal stroke a has hardly increased.

Figure 8:
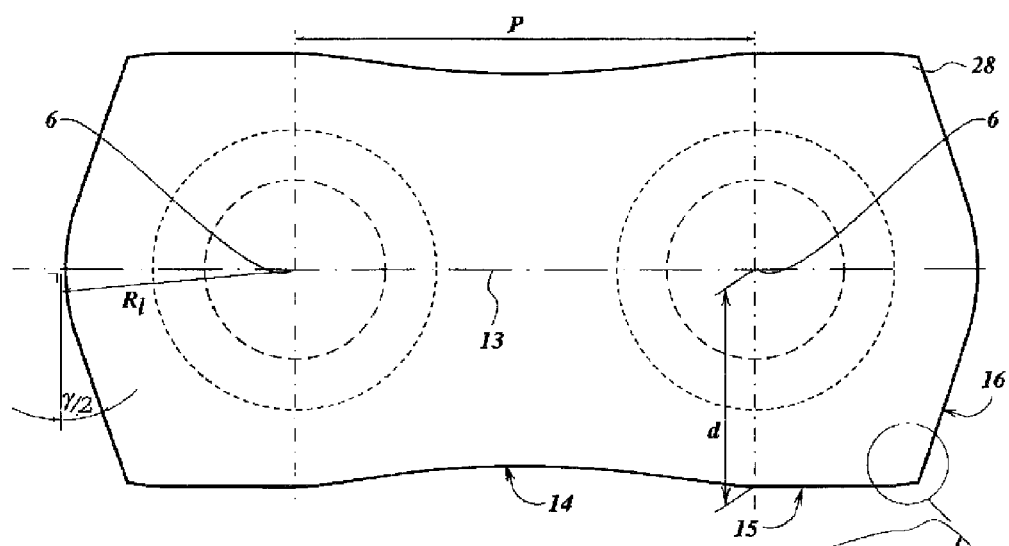
FIG. 8 shows an outside contour of a second embodiment of a chain link according to the invention.
Figure 8A:
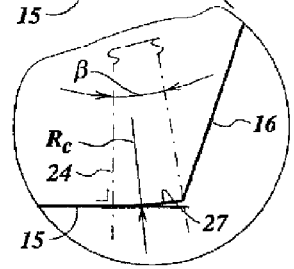
FIG. 8A shows a close-up view of an end of a link plate according to a second embodiment of the present invention.

FIGS. 8 and 8A show an embodiment of the invention whereby the outer circumference of a link plate 28 has an additional curve as compared to the link plate 12 in a similar way as in the embodiment of FIG. 6 and whereby there is no fillet connecting the curve 27 to the end side 16 of the link. Leaving out the fillet is possible when the link plates 28 are produced according an adapted process known to a skilled man, for instance sequential punching of the longitudinal and end sides of the link plate 28. Such a process might slightly increase production costs but has the advantage that the chordal stroke a is further reduced. might slightly increase production costs but has the advantage that the chordal stroke a is further reduced.

Figure 9:
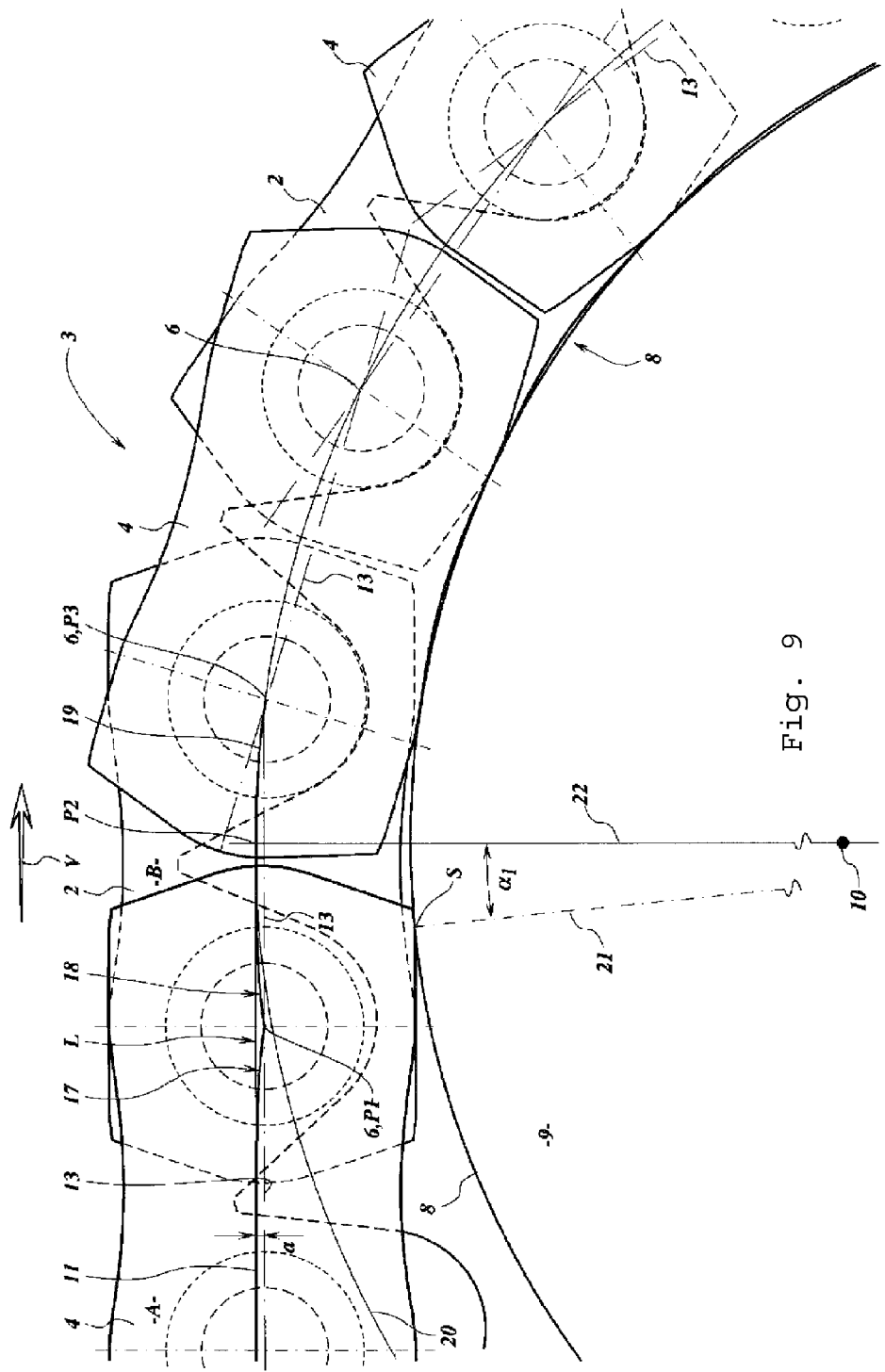
FIG. 9 shows a schematic side view of a sprocket wheel with a chain having the chain links of FIG. 8.

FIG. 9 shows the moment of impact of the chain link A on the support surface 8, whereby the chain 3 has the link plates 28 as shown in FIG. 8. Due to the avoidance of the fillet the chordal stroke a is further reduced compared to the chordal stroke shown in FIG. 7 with the radius $R_c$ at the point of impact S being similar.

Figure 10:
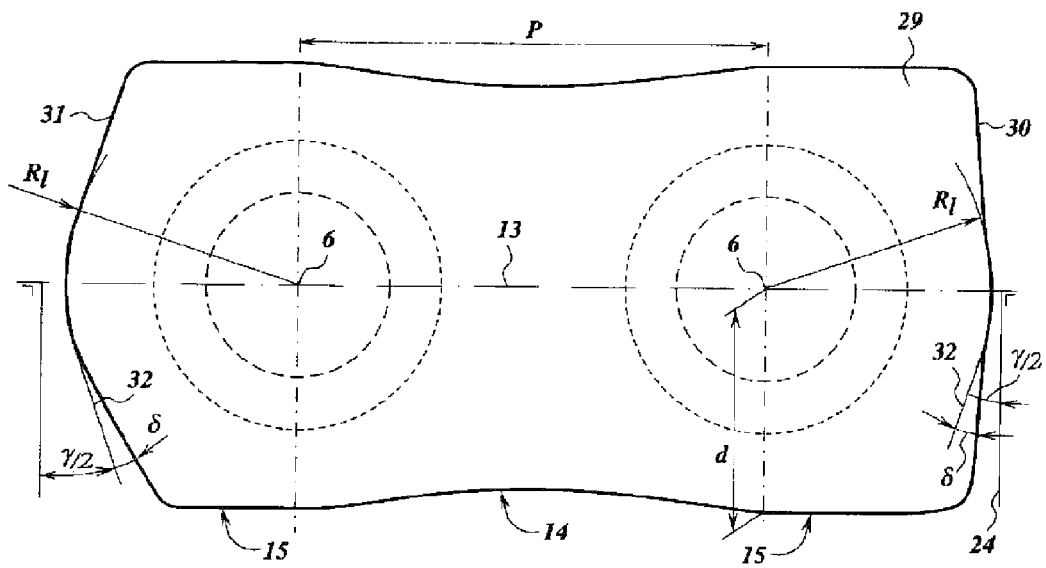
FIG. 10 shows an outside contour of a third embodiment of a chain link according to the invention.
Figure 10A:
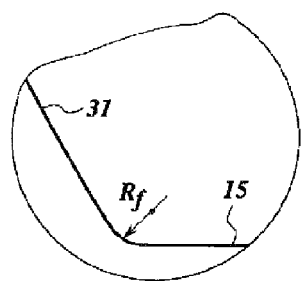
FIG. 10A shows a close-up view of one end of a link plate according to a third embodiment of the present invention.
Figure 10B:
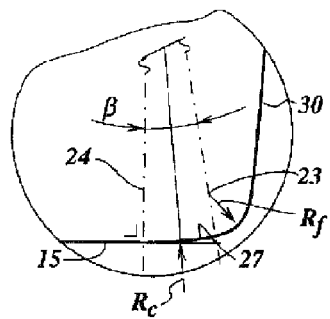
FIG. 10B shows a close-up view of the opposite end of the link plate of FIG. 10A.

FIGS. 10, 10A, and 10B show an embodiment of the invention whereby the outer circumference of a link plate 29 has an additional curve with a radius which is equal or larger than $R_c$ ending in a fillet as in the link plate 26. In order to reduce the chordal stroke the link plate 29 has an increased length of the cam surface 15 on a leading side 30 of the link plate 29 and a reduced length of the cam surface 15 on a trailing side 31. This means that the link plate 29 is asymmetric. A consequence of the link plate 29 being asymmetric is that the chordal stroke a is reduced only in one movement direction V and that in the opposite movement direction the chain will have a chordal stroke a that is slightly increased but substantially smaller than that of a chain transmission without cam surface 15. In a situation whereby the sprocket wheels rotate only in one direction this stronger chordal movement is in a part of the chain transmission where the chain links move away from the sprocket wheel and where no impact occurs. At that location the tension in the chain is low so that the stronger chordal movement does not lead to a noticeable increase of noise and unacceptable wear and vibrations.

In the earlier described link plates 12, 26, 28 and 29, see FIGS. 4, 6, 8 and 10, the end sides 16 are near the chain link axis 13 curved with a radius $R_1$ and continue towards the longitudinal sides 14 as a tangent to this radius $R_1$ which makes an angle equal to half of the pitch angle $\gamma$ with the perpendicular 24 on the chain link axis 13. The direction of this tangent is indicated with line 32 in FIG. 10. The radius $R_1$ is slightly smaller than half the pitch p. In this way there is a clearance between the link plates near the chain link axis 13 and the link plates 12, 26, 28 do not touch each other when positioned around the sprocket wheel 9. In order to get this same result with the link plate 29 the leading side 30 makes an angle with the perpendicular 24 which is an addendum angle $\delta$ smaller than half of the pitch angle $\gamma$ and the trailing side 31 makes an angle with the perpendicular 24 which is an addendum angle $\delta$ larger than half of the pitch angle $\gamma$. Near the cam surface 15 the leading side 30 ends with a fillet with radius $R_f$ and curve 27 in similar way as shown in FIG. 6. Near the cam surface 15 the trailing side 31 ends with a fillet with radius $R_f$ and there is no need for a curve 27 as the chain will only move in direction V.

Figure 11:
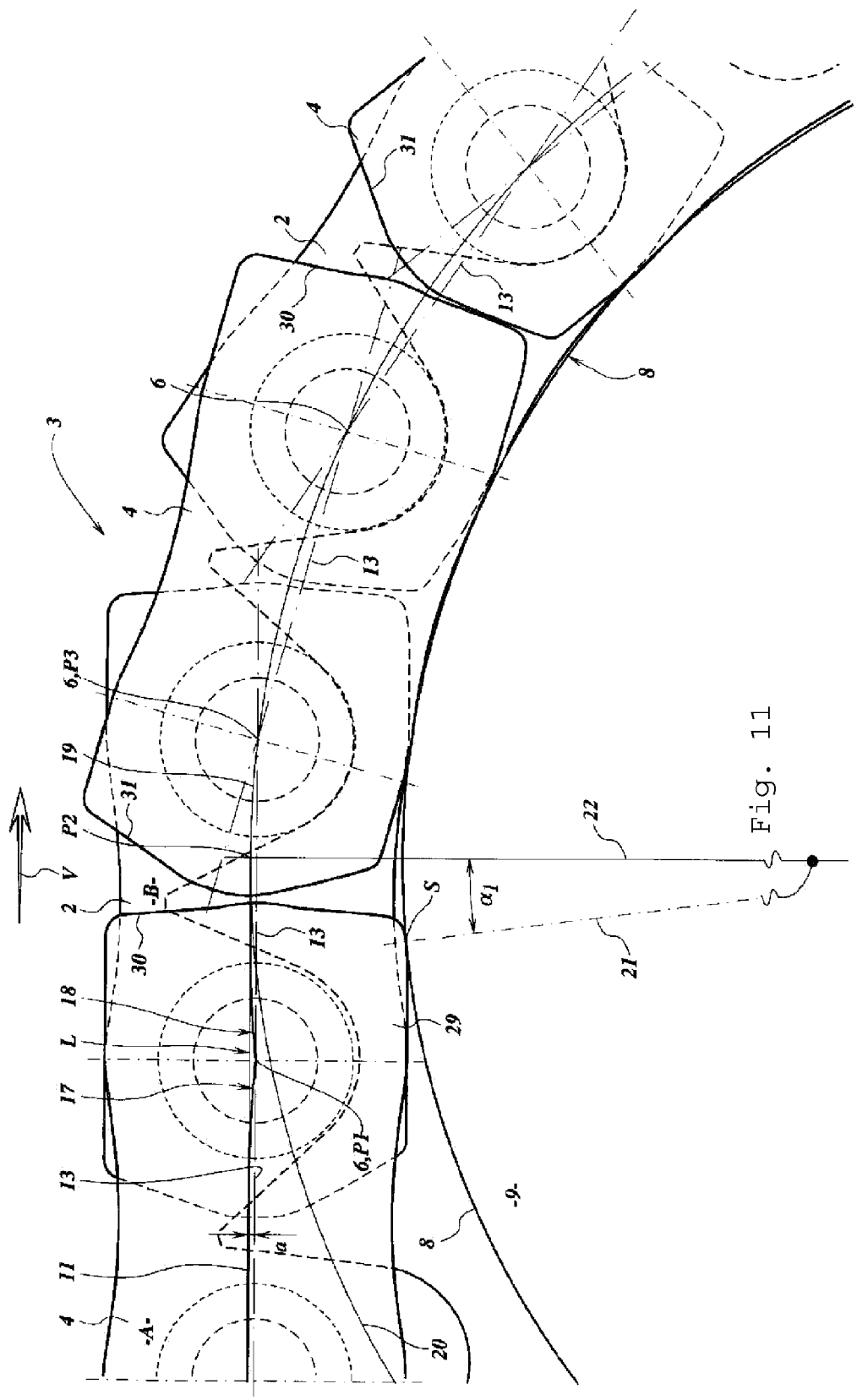
FIG. 11 shows a schematic side view of a sprocket wheel with a chain having the chain links of FIG. 10.

FIG. 11 shows the moment of impact of the chain link A on the support surface 8, whereby the chain 3 has the link plates 29 as shown in FIG. 10. Due to the asymmetry the chordal stroke a is further reduced compared to the chordal stroke as shown in FIG. 7 whereby the radius $R_c$ at the point of impact S is similar.

Figure 12:
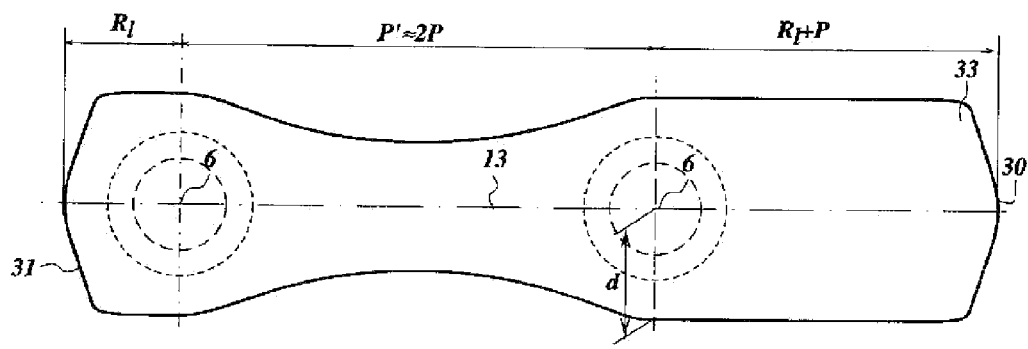
FIG. 12 shows a side view of a fourth embodiment of a chain link according to the invention.
Figure 12A:
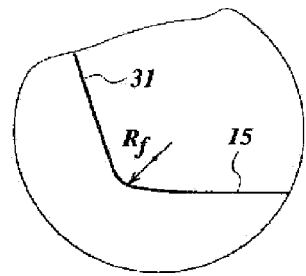
FIG. 12A shows a close-up view of one end of a link plate according to a fourth embodiment of the present invention.
Figure 12B:
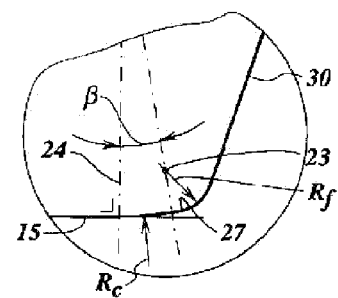
FIG. 12B shows a close-up view of the opposite end of the link plate of FIG. 12A.

FIGS. 12, 12A, and 12B show a further embodiment of the invention. An asymmetric link plate 33 is more or less similar to the link plate 26 except that it has a pitch p' which is the length of the pitch p of the earlier shown embodiments plus an additional length that is approximately equal to the pitch of link plate 26 p and the same width so that the maximum transmission force in the chain is more or less equal using half the number of chain links and the same sprocket wheel 9. Also the support surface 8 and the number of sprocket teeth 7 of the sprocket wheel 9 are more or less similar, whereby only every other tooth is used. The same effect can also be obtained by using a sprocket wheel with a reduced number of teeth. The distance between the leading side 30 and the leading pin axis 6 is also increased with the pitch of the link plate 26 p. The distance between the trailing side 31 and the trailing pin axis 6 is not changed. Towards the leading side 30 the cam surface 15 ends in the curve 27 and the fillet with radius $R_f$, towards the trailing side 31 the cam surface 15 ends with the fillet $R_f$.

Figure 13:
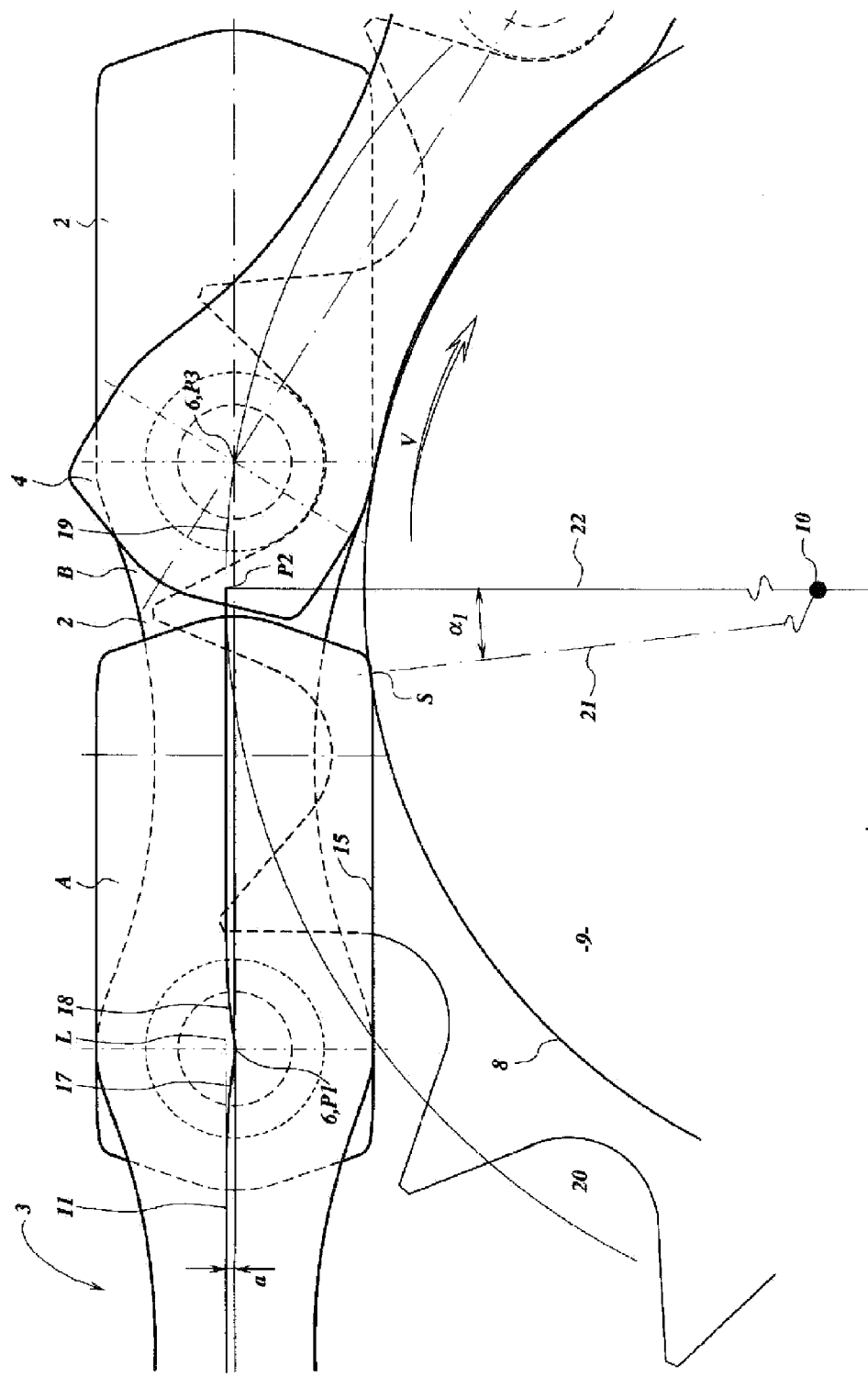
FIG. 13 shows a schematic side view of a sprocket wheel with a chain having the chain links of FIG. 12.

FIG. 13 shows a chain 3 with link plates 33 shaped as described in FIG. 12. Due to the use of the asymmetric shape of the link plates 33 the chordal stroke a is small, thereby making cost saving possible due to the reduced number of chain pins 6 and chain bushes 1 without increase in chordal stroke, wear, noise and vibrations.

In the discussed embodiments sprocket wheels 9 with sprocket teeth 7 are shown. It will be clear that in order to reduce the chordal movement on the sprocket wheels only the support surface 8 is essential. In situations where wheels are used as guide wheels without teeth the same reduction in chordal movement is obtained using the support surface 8 and the cam surface 15 on the chain links.

The above embodiments explain the invention using the example of a bush chain. The design of the link plates that cooperate with a cylindrical support on the sprocket wheel can be used for other types of chains as well, such as roller chains, Fleyer chains and Gall chains and also for chains working with sprockets without teeth or having a single inner link plate and two outer link plates.

What is claimed is:

1. A chain for a chain transmission with chain links coupled by parallel chain pins, all chain links having link plates, the chain pins forming pivot axes for the link plates at a pitch distance whereby a chain link axis perpendicularly intersects the two pivot axes, said link plates having a longitudinal side and near at least one end side of the longitudinal side of the link plates identical cam surfaces for supporting the link on cylindrical support surfaces on both sides of a sprocket wheel with a pitch angle, characterized in that a parallel part of each cam surface is parallel to the chain link axis, the parallel part starts where a line intersects the cam surface and this line begins at a pivot axis and is perpendicular to the chain link axis and the parallel part ends towards the end of the longitudinal side in an end part and the end part has a convex curved surface with an arc having a radius of curvature that is equal to or larger than half the distance from the chain link axis to the cam surface and the arc has an arc angle of at least half of the pitch angle or at least seven degrees.

2. The chain according to claim 1 whereby the radius of curvature is at least twice the distance from the chain link axis to the cam surface.

3. The chain according to claim 1 whereby the convex curved surface forms with an end side of the link plate a corner.

4. The chain according to claim 1 whereby the convex curved surface forms with an end side of the link plate a rounded corner with a fillet radius, which fillet radius preferably is at least 0.5 mm.

5. The chain according claim 1 wherein a longitudinal side of a link plate has two cam surfaces with parallel parts of different length and the parallel part of the cam surface that approaches the cylindrical support surface has a longer length than the parallel part of the other cam surface.

6. The chain according to claim 2 whereby the convex curved surface forms with an end side of the link plate a corner.

7. The chain according to claim 2 whereby the convex curved surface forms with an end side of the link plate a rounded corner with a fillet radius, which fillet radius preferably is at least 0.5 mm.

8. The chain according to claim 5 whereby the convex curved surface forms with an end side of the link plate a corner.

9. The chain according to claim 5 whereby the convex curved surface forms with an end side of the link plate a rounded corner with a fillet radius, which fillet radius preferably is at least 0.5 mm.

* * * * *